United States Patent [19]

Schoofs

[11] 4,038,209

[45] July 26, 1977

[54] CATALYST REGENERATION PROCESS

[75] Inventor: Richard J. Schoofs, Moraga, Calif.

[73] Assignee: Catco Venture, Moraga, Calif.

[21] Appl. No.: 684,471

[22] Filed: May 10, 1976

[51] Int. Cl.$^2$ .................. B01J 37/12; B01J 37/00
[52] U.S. Cl. .................... 252/419; 252/420; 252/416
[58] Field of Search ............ 252/416, 420, 419

[56] References Cited

U.S. PATENT DOCUMENTS

| 3,076,755 | 2/1963 | Stark et al. | 252/416 X |
| 3,386,922 | 6/1968 | Schoeffel et al. | 252/416 OR |
| 3,519,573 | 7/1970 | Coe | 252/419 X |
| 3,524,822 | 8/1970 | Frankovich et al. | 252/420 X |
| 3,557,019 | 1/1971 | Van Driesen | 252/416 |
| 3,753,926 | 8/1973 | Hayes | 252/419 X |
| 3,773,686 | 11/1973 | Hayes | 252/419 X |
| 3,839,191 | 10/1974 | Johnson | 252/420 X |

Primary Examiner—Patrick P. Garvin
Assistant Examiner—William G. Wright

[57] ABSTRACT

An improvement in the method of regenerating catalysts which have become inactive as a result of the accumulation of carbonaceous material on their surfaces during use by contacting them with a free oxygen-containing gas at an elevated temperature to burn the carbonaceous material from the catalyst is described. The improvement consists in wetting the catalyst with water and then contacting it with a free oxygen-containing gas at a temperature in the range about 300–600° F. for a time sufficient to evaporate substantially all of the water from the catalyst surface before burning the carbonaceous material from the catalyst.

5 Claims, No Drawings

CATALYST REGENERATION PROCESS

BACKGROUND OF THE INVENTION

A number of catalytic processes are employed in the petroleum industry for the purpose of converting crude petroleum to a variety of products having physical and chemical properties which make them suitable for use by consumers. Among the refining processes involving the use of catalysts are hydrocracking, hydrodesulfurization, hydrodenitrification and reforming. In these and other refining processes where catalysts are employed, the catalysts decline in activity during the course of use as a result, in major part, of accumulation of carbonaceous matter commonly containing hydrogen and sulfur on the catalyst surface and in the catalyst pores. A number of catalysts used in a number of the processes lose activity rapidly during the course of use and the plants in which such catalysts are employed commonly have provision for regeneration of the catalyst either in the reaction vessel itself or in an adjacent regenerator vessel to which the catalyst is transferred continuously as it is used. There are a number of catalysts, however, which are used for extended periods before they become deactivated and which continue to be effective until the build-up of carbonaceous material on the catalyst is very high. Onstream periods of months, or even years, are observed in some of the processes. In these cases, the refining units do not ordinarily include provision for catalyst regeneration and the refiner commonly discards the catalyst when it has completely lost activity and replaces it with a new charge or the catalyst may be removed from the refining unit and regenerated in a regeneration unit which is neither attached nor related to the refining unit from which the catalyst is taken.

Catalysts containing metals of groups VIb, VIIb and VIII of the periodic table, such as cobalt, nickel, tungsten, molybdenum, or mixtures of two or more of these metals supported on a conventional suport such as alumina, are commonly employed in hydrodesulfurization of various petroleum streams, hydrodenitrification of such streams and in hydrocracking high boiling petroleum streams which are previously treated to reduce sulfur and nitrogen contents. These catalysts are commonly used for extended periods before they become so deactivated by accumulation of carbonaceous deposits that they can no longer be used.

A great number of methods for regenerating catalysts which have become inactive due to the accumulation of carbonaceous material on their surfaces have been described. In nearly all of these processes, the regeneration is accomplished by contacting the inactive catalyst with a free oxygen-containing gas at elevated temperature to burn the carbonaceous material from the catalyst surface. Process conditions in the various methods differ widely. The oxygen content of the regenerating gas may vary from a very low level, below one volume percent, to very high levels in which the oxygen content is above 20%; the temperature at which the regeneration burn is carried forward is varied over a considerble range; the pressure maintained in the regeneration zone is varied over a wide range from slightly over atmospheric pressure to several hundred psig. and the volume of regenerating gas contacted with a given volume of catalyst per unit time is also varied widely. Various combinations of operating conditions are selected which are adapted to fairly completely burn the carbonaceous materials from the catalyst surface without experiencing temperature excursions and resultant sintering of the catalyst particles, but use of a free oxygencontaining gas to cause combustion of the carbonaceous deposits on the catalyst is common to nearly all of them. The difficulty of regenerating a catalyst contaminated with carbonaceous material generally varies with the level of carbon contamination and this level varies with the character of the hydrocarbon feed which has contacted the catalyst and the length of time during which the catalyst has been kept in service. More heavily contaminated catalysts require more time for regeneration and show less recovery of activity.

Pursuant to the present invention, carbon contaminated catalysts which are susceptible to reactivation by burning the carbonaceous deposits from their surfaces are subjected to a pretreatment before being contacted with a free oxygen-containing gas at a temperature adapted to cause burning to the carbonaceous deposits with the result that a greater proportion of initial activity is restored to the catalyst.

BRIEF DESCRIPTION OF THE INVENTION

It has now been found that catalysts contaminated with carbonaceous deposits which are amendable to regeneration by burning the carbonaceous materials from the catalyst surface may be more rapidly and completely regenerated by wetting the catalyst with water and then contacting it with a free oxygen-containing gas at a temperature in the range 300° to 600° F. for a time sufficient to evaporate substantially all of the water from the catalyst surface before contacting the catalyst with a free oxygen-containing gas at a sufficiently elevated temperature to cause combustion of the carbonaceous deposits from the catalyst surface. The catalyst especially amendable to regeneration by this method are hydrotreating catalysts which consist in the main of group VIb, VIIb and VIII metals supported on a rugged porous support such as alumina.

DETAILED DESCRIPTION OF THE INVENTION

The following example illustrates the operation of the process in detail.

EXAMPLE 1

A spent catalyst, comprising nickel and molybdenum supported on alumina, which had accumulated carbon deposits amounting to 8.6% by weight and sulfur deposits between 7 and 8% by weight was regenerated pursuant to the invention.

Drums were filled with the catalyst particles (⅛ inch diameter) and liquid water was poured into the drums until the water level reached the surface of the catalyst mass. After several hours, the water phase was drained from the drums and the wet catalyst was passed into a rotary kiln type regenerator. Hot gas prepared by burning natural gas in an excess of air was passed through the catalyst as it moved from the inlet end to the outlet end of the regenerator. Inlet gas temperature was controlled by adjusting the air/natural gas ratio in the mixture burned so that the temperature of the gas effluent from the regenerator was held to a temperature within a few degrees on either side of 300° F. The residence time of the catalyst in the regeneration zone was approximately one hour. The hot gas which had an oxygen content about 18% by volume was introduced into the regeneration zone at a rate of about 40 pounds per hour per pound of catalyst present in the regeneration zone. The catalyst effluent from the regeneration zone was dry and both its carbon and sulfur contents were significantly reduced. The dry catalyst was then returned to the regenerator and contacted with hot regeneration gas, the inlet temperature of the gas being adjusted to hold the temperature of the gas effluent from the regeneration zone within a few degrees on either side of 400° F. Total residence time of the catalyst in the regeneration during this step was approximately one hour. Regeneration gas was passed through the catalyst during this step at a rate of 45 pounds of gas per pound of catalyst per hour. Oxygen content of the regeneration gas was approximately 17% by volume. During this step, substantially all of the sulfur and some of the carbon was burned from the catalyst.

The catalyst effluent from the regeneration zone was again retured to the regeneration zone and contacted with regeneration gas. The temperature of the inlet gas was adjusted so as to hold the temperature of the gas effluent from the regeneration zone within a few degrees on either side of 800° F. Total residence time during this step was approximately two hours. Since the physical arrangement of the rotary kiln type regeneration zone was such that catalyst passed through it in about one hour, two passes of the catalyst through the zone were required to achieve the two hour total residence time. The regeneration was in this step had an oxygen content approximately 15.5% by volume and the gas was introduced into the regeneration zone at a rate about 45 pounds of gas per pound of catalyst in the zone per hour. The following table summarizes the procedures.

| PASS | GAS IN, ° F | GAS OUT, ° F | CARBON, %w |
|---|---|---|---|
| 1 - drying | 500 | 300 | 7.9 |
| 2 - desulfurize | 750 | 400 | 6.5 |
| 3 - 1st carbon burn | 1040 | 800 | 1.19 |
| 4 - 2nd carbon burn | 1040 | 800 | 0.16 |

The carbon contents reported on the table are based on analysis of samples periodically withdrawn during the run.

The regenerated catalyst was tested for activity in pretreating hydrocracking feeds to remove nitrogen and showed an activity which was 92% of the activity of fresh catalyst.

The same deactivated catalyst was subjected to regeneration without recourse to the wetting and drying steps. In this regeneration both the desulfurization and carbon burn steps were conducted at somewhat higher temperatures in order to obtain essentially equivalent sulfur and carbon removal using the same residence times. The following table summarizes this procedure:

| PASS | GAS IN, ° F | GAS OUT, ° F | CARBON, % w (8.58 Initial) |
|---|---|---|---|
| 1 - desulfurization | 825 1000 | 620 (Initial) 650(Final) | 6.34 |
| 2 - 1st carbon burn | 1200 | 920 | 2.75, 1.79 |
| 3 - 2nd carbon burn | 1200 | 900 | 0.32, 0.36 |

The regenerated catalyst was tested for activity in pretreating hydrocracker feeds to remove nitrogen and showed an activity which was 65% of the activity of fresh catalyst.

It will be noted in the foregoing tables that the gas inlet temperatures are higher than the gas outlet temperatures, this is due to high radiation losses from the rotary kiln regenerator.

In the foregoing example, the regenerator was a rotary kiln type regenerator. Other regenerator arrangements may be employed such as fixed bed or fluid bed but the rotary kiln is preferred since drying can be accomplished in a shorter period using this arrangement and the period and extent to which the catalyst is exposed to hot steam is shorter. A rotary kiln designed along the lines of the Roto-Louvre dryer described in *Chemical Engineering Handbook*, 4th Editon, at pp. 20–29, is especially preferred since this arrangement permits both the drying gas and regenerating gas to be passed upwardly through the layer of catalyst which lies along the bottom of the rotating cylinder.

The operating conditions employed in the several steps shown in the above example can be varied within reasonable ranges.

The wetting of the catalyst should be carried out in a manner which provides opportunity for water to thoroughly wet the surface of the catalyst and penetrate into its pores. Permitting the catalyst to be covered with water for a period of one to three hours is generally satisfactory. Longer exposure of the catalyst to water, e.g., for several days or even for several weeks, has no adverse effect. Spent catalyst is almost invariably thoroughly stripped of hydrocarbons before it is removed from the reactor in which it has been used. The presence of any hydrocarbon on the catalyst surface would inhibit the wetting process and if a catalyst proposed for regeneration is contaminated with hydrocarbon, it should be stripped, preferably with hot nitrogen gas, before being contacted wtih water.

In the drying step, the temperature of the effluent gas should be held below 600° F. and preferably at a temperature in the range about 300°–500° F. If higher temperatures are employed, an appreciable proportion of the catalyst particles would be fragmented during the drying step with the result that the quantity of useful catalyst recovered for reuse at the end of the regeneration is appreciably reduced.

The desulfurization step is employed only when the carbonaceous material with which the catalyst is contaminated has an appreciable sulfur content. If the total sulfur content of the deactivated catalyst is above about 1% by weight, then the desulfurization step should be employed. In this step, the temperature of the effluent gas should be held at a level below about 700° F. and at or above about 400° F. If higher temperatures are permitted, considerable sulfation of the metal components of the catalyst is experienced and there is a considerable loss in activity of the regenerated catalyst as a result.

During the carbon burn steps, the temperature of the effluent gas should be held below about 900° F. and desirably in the range about 650° to 900° F. and, preferably, in the range 750° to 850° F. If temperatures above 900° F. are permitted, reductions in the final activity of the regenerated catalyst are experienced. If temperatures below 750° F. are employed, the time required to complete the carbon removal is increased.

The oxygen content of the gas with which the catalyst is contacted during the drying step is preferably high, in the range about 14 to 21%. Such a gas is readily prepared by burning natural gas in an excess of air but, if desired, air may be indirectly heated to process temperature and then passed through the catalyst. The high oxygen level content of the gas employed in the drying step results in appeciable reduction of both carbon and sulfur contents of the catalyst during the drying step itself.

The oxygen content of the gas employed in the desulfurization and carbon burn steps is influenced or perhaps dictated by the character of the regenerator selected. If a fixed bed regenerator is used in these steps, then the oxygen content of the gas must be low, i.e., lower than 5% by volume and preferably about 2% by volume, in order to minimize development of local hot spots in the fixed bed with resultant sintering of the catalyst particles. If a rotary kiln-type generator is employed, oxygen contents in the range 14 to 21% are preferred. Hot spot development is suppressed by the continuous roll over the catalyst bed as the kiln rotates.

The rate at which the regenerating gas is passed into the regeneration zone will also be influenced by the type of regenerator employed, being lower in fixed bed regenerators and being preferably quite high when a rotary kiln-type regenerator is used. When the rotary kiln-type regenerator is employed, from about 15 to about 75 pounds of regenerating gas per pound of catalyst present in the regeneration zone per hour may be employed.

Residence time required for regeneration of catalyst will vary with the level of contamination by carbon and sulfur. Catalyst having coke levels from about 3 to about 7% can be regenerated using a total residence time of about two hours while catalyst containing coke at levels from 12 to 20% by weight will ordinarily require a total residence time of four to six hours.

What is claimed is:

1. In a process for reactivating catalysts which have become inactive due to deposition of from about 3 to 20% of carbonaceous deposits on their surfaces by contacting the catalyst with a free oxygen-containing gas at elevated temperature to burn off the carbonaceous deposits, the improvement which comprises:
   a. covering the catalyst with liquid water and maintaining the liquid water in contact with the catalyst for a least one hour, then
   b. contacting the catalyst with a free oxygen-containing gas at a temperature in the range about 300°–600° F. for a time sufficient to evaporate substantially all of the water from the catalyst and concurrently remove a portion of the carbonaceous deposits, and
   c. thereafter contacting the dried catalyst with a free oxygen-containing gas at a temperature in the range about 600°–900° F. to burn the remaining carbonaceous deposits.

2. A process for regenerating hydrotreating catalysts comprised of Group VIb, VIIb or VIII metals or mixtures of these metals disposed on a rugged porous support which have become deactivated during use by accumulation of from about 3 to 20% of carbonaceous materials and of sulfur materials on their surfaces which comprises:
   a. wetting the catalyst with liquid water and maintaining the catalyst in contact with the liquid water for at least one hour, then
   b. contacting the catalyst with a regenerating gas having free oxygen content in the range 14 to 21% by volume at a temperature in the range 300°–600° F. for a time sufficient to evaporate substantially all of the water from the catalyst and concurrently remove a portion of the carbonaceous materials from the catalyst,
   c. then contacting the catalyst with a free oxygen-containing gas in a regeneration zone, said gas being introduced at a temperature such that the temperature of the gas effluent from the regeneration zone is at a temperature in the range about 400°–650° F. for a time sufficient to burn substantially all of the sulfur from the catalyst, and then
   d. contacting the catalyst with a free oxygen-containing gas in a regeneration zone, said gas being introduced at a temperature such that the gas effluent from the regeneration zone is at a temperature in the range about 650°–900° F. for a time sufficient to burn substantially all of the remaining carbonaceous material from the catalyst.

3. The process defined in claim 2 wherein the regeneration zone is of the rotary kiln type and the oxygen content of the free oxygen-containing gas employed in each of steps (b), (c) and (d) is in the range about 14 to 21% by volume.

4. In a process for regenerating hydrotreating catalysts, comprises of Group VIb, VIIb or VIII metals or mixtures of metals disposed on a rugged support, which have become deactivated during the course of use by accumulation of from about 3 to 20% carbonaceous materials on their surfaces by contacting the deactivated catalysts with a free oxygen-containing gas at elevated temperature to burn off the carbonaceous materials, the improvement which comprises:
   a. wetting the catalyst with liquid water,
   b. contacting the catalyst with a gas having a free oxygen content in the range 14 to 21% by volume at a temperature in the range 300°–600° F. for a time sufficient to evaporate substantially all of the water from the catalyst and concurrently remove a portion of the carbonaceous materials from the catalyst, and
   c. thereafter contacting the dried catalyst with a free oxygen-containing gas at a temperature above that employed in step (b) to burn the remaining carbonaceous materials from the catalyst.

5. In a process for regenerating hydrotreating catalysts, comprises of Group VIb, VIIb or VIII metals or mixtures of metals disposed on a rugged support, which have become deactivated during the course of use by accumulation of from about 3 to 20% of carbonaceous materials and of sulfur materials on their surfaces by contacting the deactivated catalysts with a free oxygen-containing gas at elevated temperature to burn off the carbonaceous and sulfur materials, the improvement which comprises:
   a. wetting the catalyst with liquid water and maintaining the liquid water in contact with the catalyst for a period in excess of one hour, then
   b. contacting the catalyst with free oxygen-containing gas at a temperature in the range 300°–600° F. for a time sufficient to evaporate substantially all of the water from the catalyst and concurrently remove a porton of the carbonaceous materials from the catalyst, and
   c. thereafter contacting the dried catalyst with a free oxygen-containg gas at a temperature above that employed in step (b) to burn the remaining carbonaceous and sulfur materials from the catalyst.

* * * * *